(12) United States Patent  (10) Patent No.: US 9,011,735 B2
Wang et al.  (45) Date of Patent: Apr. 21, 2015

(54) VOLUME-LABELED NANOPARTICLES AND METHODS OF PREPARATION

(75) Inventors: Wei Wang, Oak Ridge, TN (US); Baohua Gu, Oak Ridge, TN (US); Scott T. Retterer, Knoxville, TN (US); Mitchel J. Doktycz, Knoxville, TN (US)

(73) Assignee: UT-Battelle, LLC, Oak Ridge, TN (US)

( * ) Notice: Subject to any disclaimer, the term of this patent is extended or adjusted under 35 U.S.C. 154(b) by 651 days.

(21) Appl. No.: 12/981,886

(22) Filed: Dec. 30, 2010

(65) Prior Publication Data

US 2012/0168671 A1   Jul. 5, 2012

(51) Int. Cl.
    C09K 11/04     (2006.01)
    C09K 11/06     (2006.01)
    C09K 11/08     (2006.01)
    B82Y 40/00     (2011.01)
    B82Y 30/00     (2011.01)
    H01F 1/00      (2006.01)

(52) U.S. Cl.
    CPC ............... B82Y 30/00 (2013.01); B82Y 40/00 (2013.01); H01F 1/0054 (2013.01); C09K 11/04 (2013.01); C09K 11/06 (2013.01)

(58) Field of Classification Search
    USPC .................... 252/625, 635, 644, 645, 646
    See application file for complete search history.

(56) References Cited

U.S. PATENT DOCUMENTS

| | | | |
|---|---|---|---|
| 7,029,514 | B1 | 4/2006 | Yang et al. |
| 7,235,228 | B2 | 6/2007 | Carpenter et al. |
| 7,396,589 | B2 | 7/2008 | Cho et al. |
| 7,459,145 | B2 | 12/2008 | Bao et al. |
| 7,597,959 | B2 | 10/2009 | Wang et al. |
| 2004/0214001 | A1 | 10/2004 | Oldenburg et al. |
| 2006/0245971 | A1 | 11/2006 | Burns et al. |
| 2008/0255459 | A1 | 10/2008 | Voegele et al. |
| 2009/0061006 | A1 | 3/2009 | Leuschner et al. |
| 2009/0110634 | A1 | 4/2009 | Beer et al. |
| 2010/0330477 | A1 | 12/2010 | Wu et al. |
| 2011/0064652 | A1 | 3/2011 | Borlak et al. |
| 2011/0110864 | A1 | 5/2011 | Ibanez et al. |
| 2011/0158915 | A1 | 6/2011 | Bardhan et al. |
| 2012/0082728 | A1 | 4/2012 | Schneider et al. |
| 2012/0164079 | A1 | 6/2012 | Sharma |

FOREIGN PATENT DOCUMENTS

WO   WO 2009/125086 A1   10/2009

OTHER PUBLICATIONS

Auger A. et al., "A Comparative Study of Non-Covalent Encapsulation Methods for Organic Dyes into Silica Nanoparticles", *Nanoscale Research Letters* 6:328 pp. 1-12 (2011).
Cho E-B et al., "Ultrabright Fluorescent Mesoporous Silica Nanoparticles", *Small* 6(20):2314-2319 (2010).
Ow H. et al., "Bright and Stable Core-Shell Fluorescent Silica Nanoparticles", *Nano Letters* 5(1):113-117 (2005).
Torney F. et al., "Mesoporous Silica Nanoparticles Deliver DNA and Chemicals into Plants", *Nature Nanotechnology* 2:295-300 (May 2007).
Zhao X. et al., "Development of Organic-Dye-Doped Silica Nanoparticles in a Reverse Microemulsion", *Advanced Materials* 16(2):173-176 (Jan. 16, 2004).
Lian W. et al., "Ultrasensitive Detection of Biomolecules With Fluorescent Dye-Doped Nanoparticles", *Analytical Biochemistry* 334:135-144 (2004).
Bagwe R.P. et al., "Optimization of Dye-Doped Silica Nanoparticles Prepared Using a Reverse Microemulsion Method", *Langmuir* 20(19):8336-8342 (2004).
Tan W. et al., "Bionanotechnology Based on Silica Nanoparticles", *Medicinal Research Reviews* 24(5):621-638 (2004).
Makarova O.V. et al., "Adsorption and Encapsulation of Fluorescent Probes in Nanoparticles", *J. Phys. Chem. B*. 103(43) :9090-9084 (1999).
Nyffenegger R. et al., "Synthesis of Fluorescent, Monodisperse, Colloidal Silica Particles", *Journal of Colloid and Interface Science* 159:150-157 (1993).
Van Blaaderen A. et al., "Synthesis and Characterization of Colloidal Dispersions of Fluorescent, Monodisperse Silica Spheres" *Langmuir* 8(12):2921-2931 (1992).
Final Official Action dated Aug. 14, 2013 in a related application, namely, U.S. Appl. No. 13/489,618.
Wang F. et al., "Luminescent Nanomaterials for Biological Labelling", *Nanotechnology* 17:R1-R13 (2006).
Yao G. et al., "FloDots: Luminescent Nanoparticles", *Anal Bioanal Chem* 385:518-524 (2006).
Burns A. et al., "Fluorescent Core-Shell Silica Nanoparticles: Towards "Lab on a Particle" Architectures for Nanobiotechnology", *Chemical Society Reviews* 35:1028-1042 (2006).
Pellegrino T. et al., "On the Development of Colloidal Nanoparticles Towards Multifunctional Structures and Their Possible Use for Biological Applications", *Small* 1(1):48-63 (2005).
Medintz I.L. et al., Quantum Dot Bioconjugates for Imaging, Labelling and Sensing, *Nature Materials* 4:435-446 (2005).
Hirsch L.R. et al., "Nanoshell-Mediated Near-Infrared Thermal Therapy of Tumors Under Magnetic Resonance Guidance", *PNAS* 100(23):13549-13554 (2003).
Office Action dated Jan. 31, 2013, issued by the USPTO in child U.S. Appl. No. 13/489,618.

*Primary Examiner* — Peter F Godenschwager (74) *Attorney, Agent, or Firm* — Scully, Scott, Murphy & Presser, P.C.

(57) ABSTRACT

Compositions comprising nanosized objects (i.e., nanoparticles) in which at least one observable marker, such as a radioisotope or fluorophore, is incorporated within the nanosized object. The nanosized objects include, for example, metal or semi-metal oxide (e.g., silica), quantum dot, noble metal, magnetic metal oxide, organic polymer, metal salt, and core-shell nanoparticles, wherein the label is incorporated within the nanoparticle or selectively in a metal oxide shell of a core-shell nanoparticle. Methods of preparing the volume-labeled nanoparticles are also described.

20 Claims, 6 Drawing Sheets

VOLUME-LABELED NANOPARTICLES AND METHODS OF PREPARATION

This invention was made with government support under Contract Number DE-AC05-00OR22725 between the United States Department of Energy and UT-Battelle, LLC. The U.S. government has certain rights in this invention.

FIELD OF THE INVENTION

The present invention relates, generally, to nanoparticles and core-shell nanoparticles possessing an observable label or marker, wherein the nanoparticle can be organic, inorganic, or hybrid.

BACKGROUND OF THE INVENTION

Nanoparticles and other nanosized objects are increasingly being used and integrated into numerous applications. Some of these applications include their use as contrast agents for imaging techniques, therapeutic delivery agents, biological labels (e.g., in cancer and other medical diagnostics), industrial fillers and additives, catalysts, and fuel additives.

As the use of nanoparticles continues to become more widespread, there is a growing need to monitor the transport and fate of these nanomaterials as they are increasingly released into the environment upon disposal. Attempts to track nanomaterials, particularly over lengthy time periods (e.g., months or years), has been hampered by several difficulties. In particular, the conventional method of labeling the surface of nanoparticles with an observable marker is highly susceptible to loss of the marker upon prolonged exposure of the nanoparticle to a degradative environment.

SUMMARY OF THE INVENTION

In one aspect, the invention is directed to a composition that contains nanosized objects in which at least one observable marker is incorporated within (i.e., within the body) of the nanosized object. The observable marker can be, for example, a radioisotope or a fluorophore. Such nanoparticles are herein also referred to as being "volume-labeled". By having the observable marker within the nanoparticle, the observable marker is significantly less prone to detachment from the nanoparticle, thereby permitting detection and tracking of the nanoparticles over prolonged periods and under conditions where surface-attached labels would generally become detached or degraded. Particularly in the case of organic fluorophores, the internalized labeling of the nanoparticles also advantageously protects the fluorophore, thereby providing a highly stabilized fluorescence, i.e., with a minimization of dye leakage and photobleaching. The improved fluorescence is particularly beneficial in applications that employ fluorescence, such as in biological tissue targeting and staining. The internalized labeling employed herein also advantageously leaves the surface of the nanoparticles available for functionalization with any of a host of species other than observable markers. For example, the surface of the nanoparticles may be functionalized with specific targeting agents while the observable markers remain inside the particle.

In different embodiments, the nanosized objects have a metal or semi-metal oxide (for example, silicon oxide) composition, a zerovalent metal (for example, noble metal) composition, a quantum dot composition, a magnetic composition, an organic polymer composition, and/or a core-shell composition, particularly one in which the shell is a metal oxide shell.

In another aspect, the invention is directed to a method for synthesizing the above-described volume-labeled nanosized objects. The method generally includes reacting nanoparticle precursor molecules in the presence of at least one observable marker to produce the volume-labeled nanosized objects. In particular embodiments, the nanoparticle precursor contains the observable marker therein and the observable marker is retained in the precursor molecule during synthesis of the nanoparticle. In further particular embodiments, the nanoparticle precursor molecules used in the method employs the hydrolysis of siloxane molecules containing an observable marker therein, and the resulting volume-labeled nanosized objects have a composition in which at least a portion of the composition is a silicon oxide composition.

DETAILED DESCRIPTION OF THE INVENTION

In one aspect, the invention is directed to nanosized objects (i.e., nanoparticles) in which at least one (i.e., at least one type of) observable marker is incorporated within the nanosized object. By being located within the nanosized object, the observable marker is located within the body of the nanosized object, i.e., below the surface and within the interior of the nanosized object. In some embodiments, the observable marker is also located on the surface of the nanosized object. In other embodiments, the observable marker is not located on the surface of the nanosized object. The nanosized object can have any solid composition in which an observable marker can be incorporated.

The nanosized objects generally have a size of no more than about 1000 nm. In different embodiments, the nanosized objects have a size of precisely, about, at least, up to, or less than 900 nm, 800 nm, 700 nm, 600 nm, 500 nm, 450 nm, 400 nm, 350 nm, 300 nm, 250 nm, 200 nm, 150 nm, 100 nm, 50 nm, 40 nm, 30 nm, 20 nm, 10 nm, 5 nm, 4 nm, 3 nm, 2 nm, or 1 nm, or a size within a range bounded by any two of the foregoing values. As used herein, the term "about" generally indicates within ±0.5, 1, 2, 5, or 10% of the indicated value (for example, "about 50 nm" can mean 50 nm±2%, which indicates 50±1 nm or 49-51 nm).

Generally, the nanosized objects considered herein are substantially spherical or three-dimensionally symmetrical in shape, in which case the recited size refers to a diameter of the object. However, in embodiments where the nanosized object is not three-dimensionally symmetrical (e.g., elongated, columnar, or plate-like), the recited size refers to at least one or two of the dimensional axes of the object, while one or two other dimensional axes of the object may be different in size or not nanosized, e.g., in the micron size. In some embodiments, each dimensional axis of the object is nanosized and independently selected from any of the exemplary sizes recited above. In other embodiments, one or two axes of the object are nanosized while one or two axes are not nanosized. The non-nanosized axes can be, for example, precisely or larger than 1, 1.5, 2, 2.5, 3, 4, 5, 10, 50, or 100 microns, or within a range bounded therein.

In some embodiments, the nanosized objects may possess a substantial variation in size by having a variation of 5, 10, 20, 50, or 100% difference in size from a mean size, while in other embodiments, the nanosized objects may possess a highly uniform size by having a deviation in size of no more than 2%, 1%, 0.5%, 0.2%, or 0.1% from a mean size.

Typically, the nanosized object is filled with solid material. However, in some embodiments, the nanosized object may be partly or substantially hollow, i.e., not completely filled and contains empty space. In a situation where the object is not filled, the observable marker may be embedded within a shell bounding the hollow region and/or on an inner surface of the shell in contact with the hollow region.

In a first set of embodiments, the nanosized object possesses or includes a metal chalcogenide composition, i.e., a metal-oxide, metal-sulfide, metal-selenide, or metal-telluride composition. The metal can be, for example, an alkali, alkaline earth, transition metal, main group, and rare earth (i.e., lanthanide or actinide) metals, and combinations thereof. Some examples of alkali metals include lithium, sodium, potassium, and rubidium. Some examples of alkaline earth metals include beryllium, magnesium, calcium, strontium, and barium. Some examples of transition metals include the first row, second row, and third row transition metals, having atomic numbers of, respectively, 21-30, 39-48, and 72-80, wherein the third row transition metals can optionally include lanthanum. Some examples of main group metals include those of Group IIIA (i.e., boron group elements), Group IVA (e.g., silicon, germanium, tin, and lead), Group VA (e.g., phosphorous, arsenic, antimony, and bismuth), and Group VIA (e.g., selenium and tellurium). Some examples of lanthanide metals include those having atomic numbers of 58-71, wherein lanthanum can optionally be included as a lanthanide metal. Some examples of actinide metals include those having atomic numbers of 90-103. In some embodiments, the nanosized objects have a composition that excludes one or more of any of the classes or specific types of metal chalcogenide compositions described above.

In particular embodiments, the metal chalcogenide composition is a metal oxide composition. In more specific embodiments, the metal chalcogenide composition is or includes an early transition metal oxide, first row transition metal oxide, boron group oxide, or silicon group oxide. Some examples of early transition metal oxides include scandium oxide (scandia), yttrium oxide (yttria oxide), titanium oxide (titania), zirconium oxide (zirconia), hafnium oxide (hafnia), niobium oxide (niobia), and tantalum oxide (i.e., e.g., $Ta_2O_5$ nanopowder). Some examples of first row transition metal oxides include scandia, titania, vanadium oxide, chromium oxide, manganese oxide, iron oxide, cobalt oxide, nickel oxide, copper oxide, and zinc oxide. Some examples of boron group oxides include boron oxide, aluminum oxide (alumina), gallium oxide, and indium oxide. Some examples of silicon group oxides include silicon oxide (silica), germanium oxide, and tin oxide. Any of their crystalline forms (i.e., polymorphs) are also considered herein. For example, the alpha, beta, gamma, and amorphous forms of silica and iron oxide are considered herein. The metal oxide composition can also be in one or more particular phases. For example, in some cases, a stoichiometric or non-stoichiometric metal oxide composition can have an anatase, rutile, brookite, and/or amorphous structure. Any of the compositional forms, including mixed hydroxide-oxide compositions, of these metals are also considered herein.

In some embodiments, the metal oxide nanoparticle includes silicon oxide. For example, in some embodiments, the nanoparticle is a silicon oxide nanoparticle, whereas in other embodiments, the nanoparticles include silicon oxide in combination with a non-silicon oxide material. The non-silicon oxide material can be, for example, any of the non-silicon metal oxides described above. The silicon oxide and non-silicon oxide can be in any combined form, such as a homogeneous or heterogeneous mixture. An example of a heterogeneous mixture is a layered arrangement, and in particular, a core-shell type of arrangement. In particular embodiments, the nanoparticle is a core-shell nanoparticle that contains a non-silicon metal oxide core and a silicon oxide shell (e.g., titania or zirconia core and labeled silica shell). In other particular embodiments, the nanoparticle is a core-shell nanoparticle that contains a silicon oxide core and a non-silicon metal oxide shell.

In a second set of embodiments, the nanosized objects possess or include a metal salt composition. The metal salt composition includes one or more types of metals in combination with an anion. The one or more metals can be selected from any of the metals, particularly any of the metals described above. The anion can be a simple (i.e., monoatomic) or complex (i.e., polyatomic) type of anion. Some examples of classes of metal salt compositions include the metal halides (e.g., metal fluorides, metal chlorides, metal bromides, and metal iodides), the metal nitrates, metal sulfates, metal carbonates, and metal phosphates. In particular embodiments, the metal salt composition is a rare earth salt (particularly, a lanthanide salt) composition, useful as, for example, luminescent, phosphorescent, and contrast agent materials.

In a third set of embodiments, the nanosized objects possess or include a zerovalent (i.e., elemental) metal composition. In particular embodiments, the zerovalent metal composition is or includes a noble metal composition. Some examples of noble metals include zerovalent gold, silver, palladium, platinum, rhodium, iridium, combinations thereof, and combinations with non-noble metal zerovalent transition metals.

In a fourth set of embodiments, the nanosized objects possess or include a quantum dot composition. The quantum dot composition can be a non-oxide metal chalcogenide (e.g., metal sulfide, metal selenide, or metal telluride), as described above, or a metal phosphide, arsenide, or antimonide. In particular embodiments, the one or more metals in the quantum dot composition includes one, two, or more metals selected from zinc, cadmium, copper, gallium, and indium. Some examples of quantum dot compositions include, zinc sulfide, zinc selenide, zinc telluride, zinc phosphide, zinc arsenide, zinc antimonide, cadmium sulfide, cadmium selenide, cadmium telluride, cadmium phosphide, cadmium arsenide, cadmium antimonide, gallium sulfide, gallium selenide, gallium telluride, gallium phosphide, gallium arsenide, gallium antimonide, indium sulfide, indium selenide, indium telluride, indium phosphide, indium arsenide, and indium antimonide. In some embodiments, the metal in the quantum composition is or includes aluminum, tin, copper, or lead. Some examples of such quantum compositions include aluminum selenide, tin selenide, copper selenide, copper telluride, lead selenide, and lead telluride. Some metal nitrides may also be considered quantum dot compositions, e.g., gallium nitride.

In a fifth set of embodiments, the nanosized objects possess or include a magnetic composition. In particular embodiments, the magnetic composition is or includes a magnetic metal or metal oxide composition. Some examples of magnetic metal compositions include elemental cobalt, iron, nickel, and rare earth metals, as well as their oxide compositions. As used herein, the term "magnetic" also includes a ferromagnetic, ferrimagnetic, or antiferromagnetic property. In particular embodiments, the magnetic composition is or includes an iron oxide composition, such as a magnetite ($Fe_3O_4$), hematite ($\alpha$-$Fe_2O_3$), maghemite ($\gamma$-$Fe_2O_3$) composition, or a magnetic spinel composition, such as $MnFe_2O_4$.

In a sixth set of embodiments, the nanosized objects possess or include an organic polymer composition. The organic polymer composition can be any organic polymer composition that can be formed into nanosized objects by any methods of the art, e.g., by in situ preparation during polymer synthesis, or by trituration of larger polymer particles. In particular embodiments, the organic polymer is an addition polymer. The addition polymer can be derived by any one, two, three, or more vinylic monomers, such as any of the acrylate and methacrylate types of monomers known in the art. Some related types of polymers include those derived from styrene, butadiene, acrylonitrile, divinylbenzene, ethylene, propylene, and vinylchloride. In other embodiments, the organic polymer is a condensation polymer. Some examples of condensation polymers include the polyesters and polyamides. In yet other embodiments, the organic polymer is a ring-opened polymerization polymer, such as those derived from ethylene oxide (i.e., a polyethylene oxide (PEO) polymer), or a ring-opened metathesis polymerization (ROMP) polymer, such as polynorbornene polymers of the art. In still other embodiments, the organic polymer is a polyurethane, polyurea, polysulfide, polyether, or phenol-formaldehyde type of polymer.

In a seventh set of embodiments, the nanosized objects possess or include a hybrid composition that combines at least two compositions selected from the first to sixth embodiments described above, wherein the at least two compositions are different. For example, the hybrid nanoparticle can have a core-shell arrangement in which the core contains at least one zerovalent metal, particularly a noble metal, and the shell contains at least one metal oxide, particularly silicon oxide. In other embodiments, the core is selected from a quantum dot, noble metal, magnetic, or metal salt composition, while the shell is a metal oxide composition, such as a silicon oxide composition.

In some embodiments, any one or more classes or specific types of nanoparticle compositions in any of the first to seventh embodiments, described above, is excluded from the nanoparticle composition. In some embodiments for core-shell types of nanoparticles, one or more of the above compositions is excluded either for the core or the shell, or both. In yet other embodiments, one, two, or more of any of the above compositions is included in either a core or shell of a core-shell nanoparticle.

In some embodiments, the nanoparticle composition includes a dopant level of a metal. Typically, a dopant level corresponds to no more than 1, 0.5, 0.1, 0.01, or 0.001 percent by weight of the nanoparticle. In particular embodiments, the doped nanoparticle has any of the metal, metal chalcogenide, or metal salt compositions described above. The metal dopant can, for example, serve to provide or augment fluorescence, phosphorescence, or contrast ability (as found useful in magnetic resonance imaging). In particular embodiments, the metal dopant is selected from among at least one lanthanide metal, such as one or more metals selected from lanthanum, cerium, praseodymium, europium, neodymium gadolinium, samarium, dysprosium, and terbium. In some embodiments, a lanthanide metal, either in a dopant or non-dopant level, functions as an observable marker.

In one particular set of embodiments, the observable marker is a radioisotope. The radioisotope can be any of the radioisotopes known in the art. Generally, the radioisotopes considered herein are those that have a half-life sufficient for detecting a nanoparticle over a significant period of time, i.e., at least over a 25-day period. In such embodiments, the radioisotope has a half life of at least 25, 50, 75, 100, 150, 200, 250, 300, 350 days, or a half life of at least 1, 2, 3, 4, 5, or 10 years. Some particular examples of radioisotopes having half-lives of at least 25 days include carbon-14, technetium-97, technetium-99, potassium-40, iodine-125, iodine-129, cesium-135, cesium-137, palladium-107, cadmium-113, strontium-90, europium-55, and tin-126. In some embodiments, particularly in applications in which the nanoparticles are to be detected soon after preparation and discarded, it may be permissible or desirable for the radioisotope to have a much shorter half life, e.g., up to 20, 15, 10, or 5 days, or up to 1 day, or less than 1 day, but generally, the half life is at least 1, 3, 6, or 12 hours. Some examples of such shorter-lived radioisotopes include phosphorus-32, phosphorus-33, technetium-99m, technetium-97m, technetium-94m, technetium-94, iodine-123, iodine-124, iodine-131, fluorine-18, tin-121, gallium-67, gallium-68, rhenium-186, and rhenium-188. Such radioisotopes are particularly suitable in such diagnostic techniques as positron emission tomography (PET). In particular embodiments, the radioisotope is one that is not harmful (i.e., medically useful, particularly for medical imaging applications) when administered internally into an organism, particularly a human being. In other embodiments, any one or more of the above-described classes or specific types of radioisotopes are excluded from the nanoparticle composition. In some embodiments, a long-lived radioisotope is incorporated within the volume of the nanoparticle, while one or more shorter-lived radioisotopes, such as those described above, are incorporated on the surface of the nanoparticle.

In another particular set of embodiments, the observable marker is a fluorophore. As used herein, a "fluorophore" refers to any species possessing a fluorescent property when appropriately stimulated. The stimulation that elicits fluorescence is typically illumination, although other types of stimulation (e.g., collisional) are also considered herein.

In one embodiment, the fluorophore is an organic fluorophore. The organic fluorophore can be, for example, a charged (i.e., ionic) molecule (e.g., sulfonate or ammonium groups), uncharged (i.e., neutral) molecule, saturated molecule, unsaturated molecule, cyclic molecule, bicyclic molecule, tricyclic molecule, polycyclic molecule, acyclic molecule, aromatic molecule, and/or heterocyclic molecule (i.e., by being ring-substituted by one or more heteroatoms selected from, for example, nitrogen, oxygen and sulfur). The unsaturated fluorophores may contain one or more carbon-carbon and/or carbon-nitrogen double and/or triple bonds. In some embodiments, the fluorophore is a fused polycyclic aromatic hydrocarbon (PAH) containing at least two, three, four, five, or six rings (e.g., naphthalene, pyrene, anthracene, chrysene, triphenylene, tetracene, azulene, and phenanthrene) wherein the PAH can be optionally ring-substituted or derivatized by one, two, three or more heteroatoms or heteroatom-containing groups.

The organic fluorophore may also be a xanthene derivative, such as fluorescein, rhodamine, or eosin; cyanine, or its derivatives or subclasses, such as the streptocyanines, hemicyanines, closed chain cyanines, phycocyanins, allophycocyanins, indocarbocyanines, oxacarbocyanines, thiacarbocyanines, merocyanins, and phthalocyanines; naphthalene derivatives, such as the dansyl and prodan derivatives; coumarin and its derivatives; oxadiazole and its derivatives, such as the pyridyloxazoles, nitrobenzoxadiazoles, and benzoxadiazoles; pyrene and its derivatives; oxazine and its derivatives, such as Nile Red, Nile Blue, and cresyl violet; acridine derivatives, such as proflavin, acridine orange, and acridine yellow; arylmethine derivatives, such as auramine, crystal violet, and malachite green; and the tetrapyrrole derivatives, such as the porphyrins and bilirubins. Some particular families of dyes considered herein are the Cy® family of dyes (e.g., Cy2, Cy3, Cy3B, Cy3.5, Cy5, Cy5.5, and Cy7), the Alexa® family of dyes (e.g., Alexa Fluor 350, 405, 430, 488, 500, 514, 532, 546, 555, 568, 594, 610, 633, 647, 660, 680, 700, 750, and 790), the ATTO® family of dyes (e.g., ATTO 390, 425, 465, 488, 495, 520, 532, 550, 565, 590, 594, 601, 615, 619, 629, 635, 645, 663, 680, 700, 729, and 740), and the Dy® family of dyes (e.g., DY 530, 547, 548, 549, 550, 554, 556, 560, 590, 610, 615, 630, 631, 631, 632, 633, 634, 635, 636, 647, 648, 649, 650, 651, 652, 675, 676, 677, 680, 681, 682, 700, 701, 730, 731, 732, 734, 750, 751, 752, 776, 780, 781, 782, and 831). The ATTO dyes, in particular, can have several structural motifs, including, coumarin-based, rhodamine-based, carbopyronin-based, and oxazine-based structural motifs.

In some embodiments, the volume-labeled nanoparticles described herein have a non-functionalized surface. By being a non-functionalized surface, the surface of the nanoparticle has not been modified to contain functional surface groups beyond any surface composition originally present on completion of particle synthesis. In other embodiments, a non-functionalized surface is one containing substantially non-reactive groups, such as hydrocarbon, ether, or metal hydroxide (M-OH) groups.

In other embodiments, the volume-labeled nanoparticles described herein have a functionalized surface. Functionalization of the surface can be employed to, for example, alter the reactivity and/or properties of the surface. For example, functionalization of metal oxide nanoparticles with a hydrophobic siloxane (e.g., an alkyltrimethoxysilane) can be achieved, as known in the art, via siloxane hydrolysis reaction with surface hydroxy groups, to produce a hydrophobized metal oxide nanoparticle. In an analogous manner, using a hydrophilic siloxane (e.g., an ethylene oxide- and/or hydroxy-functionalized trialkoxysilane), a hydrophilized metal oxide nanoparticle can be produced. By similar principles, a noble metal or quantum dot nanoparticle can be functionalized by using a hydrophobic or hydrophilic version of a thiol or phosphine molecule.

Moreover, various reactive functionalities (e.g., amine, carboxyl, and/or thiol groups) can be incorporated on the surface by inclusion of these reactive functionalities in functionalized surface molecules. Typically, the functional surface molecules possess reactive portions that are available, i.e., a reactive portion available (i.e., accessible) for subsequent reaction, particularly for the purpose of binding other molecules to the surface of the labeled nanoparticle. For example, particularly in the case of metal oxide nanoparticles, siloxane molecules containing one or more amino groups (e.g., 2-aminoethyl-trimethoxysilane and 3-aminopropyltrimethoxysilane) can be reacted with the metal oxide surface. Other siloxane molecules containing functional groups include those with mercapto groups (e.g., 2-mercaptoethyltrimethoxysilane and 3-mercaptopropyltrimethoxy silane), those with carboxy groups (e.g., trimethoxysilylpropionic acid and trichlorosilylpropionic acid), those with halogen groups (e.g., 2-chloroethylmethyldimethoxysilane), those with epoxy groups (e.g., 3-glycidoxypropyl)methyldimethoxysilane, those with aldehyde groups (e.g., triethoxysilylbutyraldehyde), those with phosphino groups (e.g., 2-(diphenylphosphino)ethyltriethoxysilane), those with positively charged groups, such as quaternary ammonium groups (e.g., 2-(trimethoxysilyl)ethyl-2-N-methylpyridinium chloride), and those with negatively charged groups, such as carboxylate groups (e.g., $(Na^{+-}O(O)CCH_2)_2NCH_2CH_2N(CH_2C(O)O^-Na^+)$—$(CH_2CH_2CH_2Si(OCH_3)_3)$). Numerous of these functionalized siloxanes are commercially available.

Similarly, particularly in the case of noble metal nanoparticles, amine-containing and hydroxyl-containing thiol or phosphine molecules (e.g., a mercaptoalkylamine, mercaptoalcohol, phosphinoalkylamine, or phosphinoalcohol) can be used to functionalize the metal surface. In functionalizing the surface of such metal nanoparticles, it is well known that the mercapto or phosphino portion will adhere to the metal surface, thereby allowing functional groups on the other side of the molecule to be extended radially outward away from the metal surface. For example, reacting noble metal nanoparticles with mercapto or phosphino siloxanes will generally result in the attachment of the siloxane molecules on the metal surface such that silicon alkoxide groups are pointed away from the surface, and thus, accessible for hydrolysis (useful, for example, in producing a metal oxide shell on the nanoparticle). In analogous embodiments, ionic functional groups can be reacted with nanoparticle surfaces to render the surfaces charged.

The functionalized surface described above can be further reacted, if desired, to attach one or more other chemical substituents on the surface. For example, by reacting surface amine groups with an amine-reactive (e.g., succinimidyl ester) substituent, the substituent can be attached to the surface of the nanoparticle. The substituent can be, or include, for example, a polarity adjusting substituent, a marker (e.g., radioisotope, fluorophore, or rare earth metal), or a biological substituent, such as a protein (e.g., antibody, antibody fragment, or enzyme), oligopeptide, peptide, amino acid, nucleic acid, oligonucleotide, nucleobase, polysaccharide, oligosaccharide, saccharide, lipid, lipoprotein, glycoprotein, or glycolipid. Any of the foregoing exemplary types of substituents can be configured to contain an amine-reactive, thiol-reactive, or hydroxy-reactive group by methods well known in the art. Alternatively, any of the foregoing exemplary types of substituents may contain naturally-reactive native groups (e.g., amino, hydroxyl, and/or thiol) that can be reacted with reactive groups on the surface of the nanoparticle in order to attach such substituents onto the nanoparticle surface.

In another aspect, the invention is directed to methods for producing the volume-labeled nanoparticles described above. The methods generally involve reacting nanoparticle precursor molecules in the presence of at least one observable marker in a manner that causes the label (i.e., observable marker) to be incorporated within the nanoparticle. Generally, the methods considered herein are solution methods for preparing nanoparticles.

In particular embodiments, the preparative method employs precursor molecules in which one or more labels are incorporated (i.e., attached). The label can be attached to the precursor molecule by, for example, one or more covalent, ionic, hydrogen, dispersion, or dative bonds. For example, for the preparation of volume-labeled metal oxide nanoparticles, metal-alkoxide (M-OR), metal-amide (M-NR), metal-hydroxide (M-OH), or metal halide precursor molecules, in which a label is incorporated, can be hydrolyzed by methods known in the art to produce the corresponding metal oxide nanoparticles. The metal (M) can be any of the metals described above. In other embodiments, for the preparation of volume-labeled noble metal nanoparticles, metal salt precursors containing a label incorporated therein, can be reduced, by methods known in the art, to produce zerovalent metal nanoparticles. Volume-labeled quantum dot nanoparticles can be analogously prepared by incorporation of labels in quantum dot precursor molecules. Polymer nanoparticles can be analogously produced by incorporation of labels in polymer precursor molecules.

In other embodiments, the label is incorporated into the nanoparticle without incorporation of the label into a precursor molecule, but rather, by conducting the preparative method in a liquid medium in which the label is contained. For example, to produce volume-labeled metal oxide nanoparticles by this method, unlabeled metal oxide precursor molecules can be mixed in a solution containing labels or labeled molecules, and the solution subjected to conditions in which the metal oxide precursor molecules hydrolyze to produce metal oxide nanoparticles. By virtue of probability, at least a portion of the nanoparticles will contain one or more labels. Moreover, the amount of labels incorporated into the particles can be adjusted by appropriate adjustment of the concentration of labels used in the method. The foregoing method can be analogously applied for preparing zerovalent metal, quantum dot, metal salt, and polymer nanoparticles.

In some embodiments, labels are incorporated into a nanoparticle by in-situ formation during the particle synthesis. For example, formation of $SiO_2$ nanoparticles by hydrolysis of a siloxane or other hydrolyzable silane can be conducted in a metal ion-containing solution, wherein the one or more metal ions are chalcophile metals, such as $Cd^{2+}$, $Zn^{2+}$, or $Pb^{2+}$. By the addition of one or more chalcogens (e.g., sulfur, selenium, and/or tellurium, such as $S^{2+}$, $Se^{2+}$, and/or $Te^{2+}$ forms), quantum dot nanoparticles, such as CdS, ZnS, or PbS quantum dots, can be formed simultaneously with $SiO_2$ nanoparticles, thereby producing $SiO_2$ nanoparticles having quantum dot cores incorporated therein. Similarly, formation of $SiO_2$ nanoparticles by silane hydrolysis can be conducted in a noble metal ion-containing solution, such as a solution containing $Ag^+$, $Pd^{2+}$, $Pt^{2+}$, $Au^+$, $Au^{3+}$, and/or $Rh^{3+}$. By the addition of a reductant (e.g., sodium borohydride), or by employing a physical reduction process (e.g., photoreduction or ultrasonication), noble metal particles can be formed simultaneously with $SiO_2$ nanoparticles, thereby producing $SiO_2$ nanoparticles having noble metal cores incorporated therein. By similar methodology, superparamagnetic cores, such as those having a $Fe_3O_4$, FePt, $CoFe_2O_4$, or $MnFe_2O_4$ composition, can be incorporated into $SiO_2$ nanoparticles. In particular embodiments, the size of the quantum dot, noble metal, or superparamagnetic cores are in the range of 1-10 nm or 1-5 nm, while the $SiO_2$ nanoparticles are within the same size range or larger, e.g., at least 2, 3, 5, 7, 10, 12, 15, 20, 25, 30, 40, or 50 nm, or within a range bounded by any two of the foregoing exemplary values. The label (e.g., radioisotope or fluorophore) can be incorporated, by any of the methods described above, into the quantum dot, noble metal, superparamagnetic, and/or $SiO_2$ nanoparticles to produce volume-labeled composite particles.

In other embodiments, labels are incorporated into a nanoparticle by depositing a volume-labeled shell onto a nanoparticle core. For example, nanoparticles of a metal oxide (e.g., titania, silica, or zirconia) can be combined in solution with labeled siloxane molecules, which, upon being subjected to hydrolysis conditions, condense with metal oxide surfaces and amongst each other to form a volume-labeled silicon oxide shell on the metal oxide nanoparticles. An analogous procedure can be employed for coating zerovalent metal, quantum dot, metal salt, and polymer nanoparticles. In different embodiments, the core and shell of the core-shell nanoparticle independently possess thicknesses of precisely, at least, up to, or less than 500 nm, 450 nm, 400 nm, 350 nm, 300 nm, 250 nm, 200 nm, 150 nm, 100 nm, 50 nm, 40 nm, 30 nm, 20 nm, 10 nm, 5 nm, 4 nm, 3 nm, 2 nm, or 1 nm, or a thickness within a range bounded by any two of the foregoing values. In some embodiments, the core is thicker than the shell. In other embodiments, the shell is thicker than the core. In other embodiments, the core and shell have the same, or about or substantially the same, thickness. In some embodiments, the nanoparticle cores are produced in situ in the same solution in which metal alkoxide shell formation is conducted.

In particular embodiments, a volume-labeled silica nanoparticle (or volume-labeled silica shell) is produced by hydrolysis of labeled silicon alkoxide (i.e., siloxane) molecules. Some examples of silicon alkoxide molecules include the orthosilicates, i.e., $Si(OR)_4$, (e.g., tetramethylorthosilicate (TMOS) and tetraethylorthosilicate (TEOS)), the alkyltrialkoxysilanes (i.e., $RSi(OR)_3$), the dialkyldialkoxysilanes (i.e., $R_2Si(OR)_2$), the disiloxanes (i.e., $R^1_3Si-O-SiR^1_3$), trisiloxanes (i.e., $R^1_3Si-O-SiR^1_2-O-SiR^1_3$), higher siloxanes (e.g., tetrasiloxanes, pentasiloxanes, hexasiloxanes, and polysiloxanes), cyclotrisiloxanes, cyclotetrasiloxanes, cyclopentasiloxanes, cyclohexasiloxanes, and the silsesquioxanes, wherein R independently represents a hydrocarbon group, and at least two of the $R^1$ groups for a siloxane molecule are, independently, alkoxide groups. Hydrolysis of corresponding silicon hydroxide, silylamide, or halide (e.g., silicon chloride) derivatives can achieve the same end result as hydrolysis of the siloxanes. The label (e.g., radiolabel and/or fluorophore) may be represented by, or included in, any of the R or $R^1$ groups shown in the foregoing exemplary siloxane molecules. In some embodiments, all (i.e., 100%) of the siloxane precursor molecules are labeled. In other embodiments, a portion of the siloxane precursor molecules is labeled and a remaining portion is unlabeled. For example, in different embodiments, at least, precisely, up to, or less than 1%, 5%, 10%, 20%, 30%, 40%, 50%, 60%, 70%, 80%, 90%, 95%, 98%, or 99% of the siloxane precursor molecules are labeled with the remainder being unlabeled (wherein it is understood that less than any of the exemplary amounts still includes more than 0%, or at least 0.1% or 0.5%). Moreover, unlabeled siloxane precursor molecules, if present, may be compositionally the same or different, aside from the presence or absence of the label, than the labeled siloxane precursor molecules. Furthermore, the siloxane precursor molecules may be mixed in any useful proportion with non-silicon alkoxide precursor molecules (e.g., titanium alkoxide, aluminum alkoxide, or zirconium alkoxide) to form a mixed silicon-metal oxide nanoparticle composition.

In a first set of embodiments, at least a portion of the siloxane precursor molecules are radioisotope-labeled siloxane molecules. The radioisotope can be bound to the siloxane in any suitable manner. For example, the siloxane can contain one or more metal-binding groups, such as ether, polyether (e.g., crown ether), amine, polyamine (e.g., cyclic polyamine, such as a porphyrin, or non-cyclic polyamine, e.g., ethylenediamine or diethylenetriamine), carboxylic acid, thiol, chelating moieties (e.g., to chelate $^{99}$Tc, $^{97}$Tc, $^{135}$CS, $^{40}$K, or $^{90}$Sr), and combinations thereof. In particular embodiments, the radioisotope-labeled siloxane molecule is prepared by reacting a siloxane molecule containing a first reactive group with a radioisotope bound to a second reactive group, wherein the second reactive group is reactive with the first reactive group. For example, a siloxane molecule containing an amino group can be reacted with a radonuclide-labeled amine-reactive molecule, such as a $^{14}$C-labeled succinimidyl ester, where the $^{14}$C label is located on the carboxy carbon or other portion of the succinimidyl ester to be retained on the amino siloxane after reaction. Alternatively, a siloxane molecule containing an amino-reactive group thereon (e.g., carboxyl, activated ester, or alkyl halide) is reacted with a $^{14}$C-labeled amine-containing molecule in order to produce a $^{14}$C-labeled siloxane molecule. Analogous types of reactions can be conducted, for example, between a thiol-containing siloxane and a radionuclide-labeled thiol-reactive molecule (such as a radionuclide-labeled maleimide-containing molecule), or between an aldehyde-containing siloxane and a radionuclide-labeled aldehyde-reactive (e.g., amine- or phenol-containing) molecule, or between an isocyanate-containing siloxane and a radionuclide-labeled amine- or hydroxy-containing molecule.

In particular embodiments, a radioisotope-labeled siloxane is produced by reacting a vinyl-containing siloxane with a radionuclide-labeled acrylic acid molecule under conditions that cause the vinylic portions of the siloxane and acrylic molecules to link via a carbon-carbon bond, typically achieved by subjecting the vinylic precursors to conditions suitable for addition polymerization. As known in the art, by adjustment of reaction conditions (e.g., reaction time, as controlled by timing of quencher), the product resulting from addition reaction of vinylic siloxane and acrylic molecule can be single molecules of relatively low molecular weight (e.g., containing two, three, or four vinylic units), oligomers (e.g., five, six, and up to 20 vinylic units), or polymers (generally greater than 20, 50, or 100, and up to 1000 vinylic units) as generally produced by addition polymerization. The vinyl-containing siloxane can be, for example, a vinyltrialkoxysilane, a divinyldialkoxysilane, a trivinylalkoxysilane, an allyltrialkoxysilane, or more generally, a compound of the general formula $CH_2=CH-(CH_2)_n-Si(OR)_3$, wherein n is a number of 0, 1, 2, 3, 4, and, typically, up to 6, 8, 10, or 12, and R is a hydrocarbon group, such as a straight-chained, branched, or cylic alkyl, aliphatic, or aromatic group. In particular embodiments, the labeled acrylic acid molecule has a carbon-14 label, preferably on its carboxy carbon portion. The labeled acrylic acid molecule is typically of the formula $CH_2=CH-COOH$ where any of the carbon atoms therein is a suitable carbon radionuclide, or more generally, of the formula $CR_2=CR-COOR$, wherein each R group independently represents a hydrogen atom or hydrocarbyl group, as defined above, and at least one radionuclide atom is present in the labeled acrylic molecule, e.g., as a carbon-14 atom substituting any of the carbon atoms shown, or in any of the R groups. A completely analogous set of conditions can be achieved by use of a radiolabeled acrylamide molecule instead of, or in combination with, an acrylic acid molecule. The acrylamide molecule can be of the formula $CR_2=CR-CONR_2$, wherein R is independently selected from H or a hydrocarbon group, as defined above, and at least one radionuclide atom is present in the labeled acrylamide molecule, e.g., as a carbon-14 atom substituting any of the carbon atoms shown, or in any of the R groups.

Some particular methodologies, exemplary of those described above, in producing radioisotope-labeled siloxane molecules can be generically exemplified by the following set of equations:

In formulas (1) and (2), R is independently selected from H or any of the hydrocarbon groups described above, and m can be, for example, 1, 2, 3, 4, 5, 10, 20, 50, 100, 200, 500, 1000, or within a range bounded by any two of these values.

The products shown in formulas (1) and (2) are precursors to silica-containing nanoparticles. By hydrolysis methods known in the art, these siloxane molecules will be converted to a silica-containing composition that includes the indicated radiolabel. As discussed above, the radiolabeled siloxane molecules may be hydrolyzed with or without an unlabeled metal alkoxide. If hydrolyzed with an unlabeled metal alkoxide, the metal alkoxide may be a silicon alkoxide, and/or any other metal alkoxide, such as those described above. In addition, the radiolabeled siloxane molecules may be hydrolyzed with another labeled metal alkoxide, wherein the labels may be the same or different.

The radiolabeled vinylic molecule is not limited to an acrylic acid or acrylamide. For example, in some embodiments, it may be preferred to use a radiolabeled vinyl-containing molecule bearing substantially non-reactive groups other than the vinyl group. Some examples of such radiolabeled vinyl-containing molecules include those represented by the general formula $CR_2=CR_2$, wherein R is independently selected from H or any of the hydrocarbon groups described above, provided that the molecule is non-gaseous at room temperature (i.e., 20-30° C.), and at least one radionuclide atom is present in the labeled molecule, e.g., as a carbon-14 atom substituting any of the carbon atoms shown or in any of the R groups. Aside from hydrogen and hydrocarbon groups, one or more of the R groups may be a functional group selected from, for example, halogen (e.g., F, Cl, or Br), hydroxy, alkoxide, amino, imino, epoxide, mercapto, ester, activated ester, maleimide, succinimide, aldehyde, or a charged group, or alternatively, an alkyl or alkyleneoxide group containing any one or more of the foregoing groups.

In other embodiments, a radioisotope-labeled siloxane is produced by, first, hydrolyzing vinyl-containing siloxanes to produce a vinyl-containing polysiloxane, wherein the polysiloxane may contain, for example, 2, 3, 4, 5, 10, 20, 50, 100, or more siloxane units, a portion of which or all of which contain a vinyl group. The vinyl-containing polysiloxane molecule or polymer may then be reacted, via an addition reaction, with a labeled vinylic molecule (e.g., a labeled acrylic acid or acrylamide). Alternatively, or in addition, the vinylic groups or other groups in the polysiloxane molecule or polymer include a radiolabel or fluorophore. In some embodiments, the vinyl-containing polysiloxane may include remaining unreacted groups capable of further polymerization or particle growth. For example, the vinyl-containing polysiloxane may include, after reaction with labeled vinylic molecules, silyl ether or glycidyl groups that can be further reacted to form the final nanoparticle.

The addition reactions described above can be achieved by any of the methods known in the art. In particular embodiments, the addition reaction is achieved by a microemulsion method. In particular embodiments of the microemulsion method, a water-in-oil (W/O) microemulsion is employed in which micron- or nanometer-sized aqueous droplets, in which the reaction components are contained, are suspended in a continuous oil component. Typically, a surfactant is included, which helps to retain the shape and integrity of the water droplets. A particular advantage of the microemulsion method is that the compartmentalized (i.e., volume-confined) water droplets serve as nanosized reactors, thus limiting particle growth. The surfactant lying on the water-oil interface typically further limits particle growth by adhering to the nanoparticle surface during growth, thereby minimizing particle aggregation. By the microemulsion method, substantially uniform particle sizes are attainable. The particle size and monodispersity of the particles can further be controlled by varying the microemulsion composition, the reactant concentration, pH, stabilizer additives, and reaction temperature. Generally, a substantially monodisperse batch of nanoparticles is indicated by a polydispersity of 20% or less, e.g., up to or less than 20%, 18%, 15%, 12%, or 10%.

In particular embodiments, trimethoxyallylsilane (TMOAS) is dissolved and hydrolyzed in a microemulsion at neutral pH until incorporated, e.g., 0.5-4 hours, depending on conditions, such as temperature and stirring rate. A labeled (e.g., carbon-14) acrylic acid (AA) is added into the microemulsion and mixed until incorporated. Polymerization begins by either exposure to suitably reactive irradiation (e.g., UV light) or incorporation of a polymer initiator (e.g., $(NH_4)_2S_2O_8$). A hydrolysis accelerant (e.g., $NH_3 \cdot H_2O$) may be added to accelerate hydrolysis and polymerization of TMOAS. In a preferred method for including particle growth, tetraethylorthosilicate (TEOS) or other unlabeled siloxane is added to the polymerized TMOAS and reacted for several hours (e.g., 3-36 hours). If functionalization with surface carboxy groups is desired, a carboxy-functionalized siloxane, such as N-(trimethoxysilylpropyl)ethylenediamine triacetic acid trisodium salt (TMOS—COOH) can be added and allowed to react for several more hours.

To isolate and wash the volume-labeled nanoparticles, the microemulsion is preferably destabilized and centrifuged to separate the particles. The particles can then be redispersed into a solvent, such as acetone, separated again by centrifuge, and if desired, redispersed in another solvent, such as ethanol, before centrifuging again. Ultimately, the volume-labeled nanoparticles can be redispersed into water.

A fluorophore can be incorporated into a nanoparticle by analogous methodology. For example, in the production of fluorophore-labeled silica nanoparticles, a fluorophore derivative containing one or more reactive groups therein can be reacted with a siloxane molecule containing groups reactive with said reactive groups. The reactive groups in the fluorophore and siloxane molecules can be, for example, vinylic groups, such as any of the vinylic molecules described above. Completely analogous to the methodology described above for radiolabel incorporation, a vinylic siloxane can be reacted with a vinylic fluorophore via an addition reaction. Numerous other reactive group combinations, as known in the art and as described above, can also be used for linking the fluorophore onto a siloxane, e.g., any of the amino-(amino reactive), alcohol-(alcohol reactive), thiol-(thiol reactive) combinations may be used.

In particular embodiments, the fluorophore is attached to a siloxane by the following general equation:

$$\text{Fluoro-Y} + \text{Z—(CH}_2)_n\text{—Si(OR)}_3 \rightarrow \text{Fluoro-(CH}_2)_n\text{—Si(OR)}_3 \quad (3)$$

In formula (3), Fluoro represents a fluorophore, n is generally 0, 1, 2, 3, 4, 5, 6, 7, 8, 9, 10, 11, or 12, Y is a group reactive with Z, and Z is a group reactive with Y. In particular embodiments, Z is an amino group, and Y is an amino-reactive group, such as isocyanate (—NCO), isothiocyanate (—NCS), alkylbromo, alkyliodo, aldehyde, ester, or reactive ester (e.g., succinimidyl ester). Although Y and Z are shown absent in the product, it is understood that a portion of Y and/or Z typically remains in the product as part of a linking moiety. The fluorophore-siloxane molecule is then hydrolyzed, either by itself, or in combination with other labeled or unlabeled siloxane or other metal alkoxide, to form the oxide nanoparticles or a volume-labeled silica shell on a nanoparticle core.

Examples have been set forth below for the purpose of illustration and to describe certain specific embodiments of the invention. However, the scope of this invention is not to be in any way limited by the examples set forth herein.

EXAMPLE 1

Preparation and Analysis of (Carbon-14)-Volume Labeled Silica Nanoparticles Prepared by $^{14}$C-Acrylic Acid Doping of a Vinyl-Functionalized Siloxane As a general summary, isotope-labeled $SiO_2$ nanoparticles were synthesized by co-hydrolyzing tetraethylorthosilicate (i.e., tetraethoxysilane, or TEOS) and an isotope-containing silane in microemulsion media. The isotope-containing silane was prepared by grafting the isotope into a silane precursor by a radical-induced polymerization reaction.

In a particular experiment, approximately 5 mg of $C^{14}$-acrylic acid ($C^{14}$-AA) containing 125 µCi $C^{14}$ was first mixed with 0.2 g of trimethoxyallylsilane (TMOAS) as a microemulsion at neutral pH, and stirred for two hours. Then 0.2 mL of 0.5 M $(NH_4)_2S_2O_8$ was added to the microemulsion to initiate polymerization of TMOAS and $C^{14}$-AA. After 30 minutes, 2 mL of 29% ammonia solution and 9.3 mL TEOS was added into the microemulsion and the reaction stirred for 12 hours. Then 1 mL of N-(trimethoxysilylpropyl)-ethylenediamine triacetic acid trisodium salt (TMOS—COOH), a surface charge enhancement agent, was added dropwise to the microemulsion, and the reaction was stirred for an additional 12 hours. In a typical synthesis, the microemulsion medium was composed of 25.0 g Igepal CO-520/210 mL cyclohexane/3.3 mL water/2.5 mL 29% ammonia, which was generally found to produce nanoparticles having a size of about 33 nm.

Upon completion of the reaction, the microemulsion was destabilized by adding isopropanol, and the produced nanoparticles were collected by centrifugation. The nanoparticles were purified by washing with ethanol, acetone, and water multiple times.

Figure 1A:
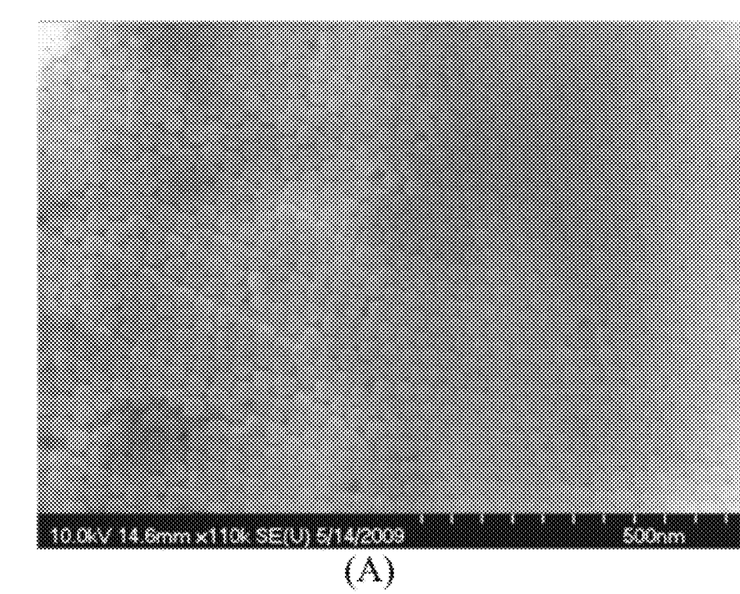
FIGS. 1A, 1B. SEM micrographs of (carbon-14)-labeled silica nanoparticles (average size 33.1 nm) with carboxy surface functionalization at (A) 110K magnification and (B) 200K magnification.
Figure 1B:
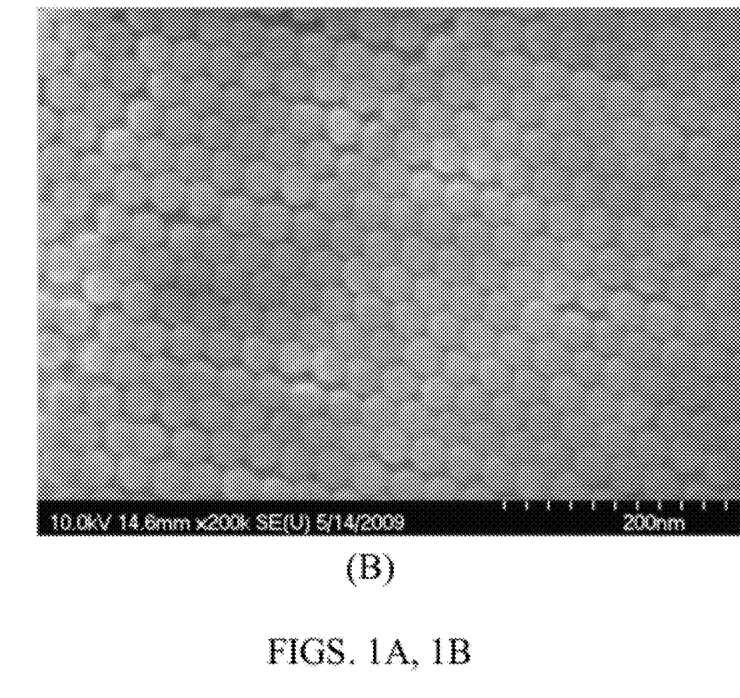

FIG. 1 (A, B) shows SEM images of $C^{14}$-labeled $SiO_2$ nanoparticles synthesized in the above-described microemulsion (A) and in another microemulsion composed of 27.5 g Igepal-CO-720, 22.0 mL hexanol, 170 mL cyclohexane, 10.7 mL $H_2O$, and 3.0 mL 29% ammonia (B). The recipe B produces nanoparticles generally in the size range from about 70 to 80 nm. The SEM images show that the synthesized nanoparticles are spherical shaped and highly uniform in size with average sizes of 32.7±3.1 nm and 74.8±3.9 nm, respectively. Dynamic light scattering (DSL, Brookhaven 90Plus Particle Size Analyzer) measurements also show that the average hydrodynamic particle sizes in water are about 36 nm and 78 nm respectively, with a size polydispersity of <10%.

Figure 2:
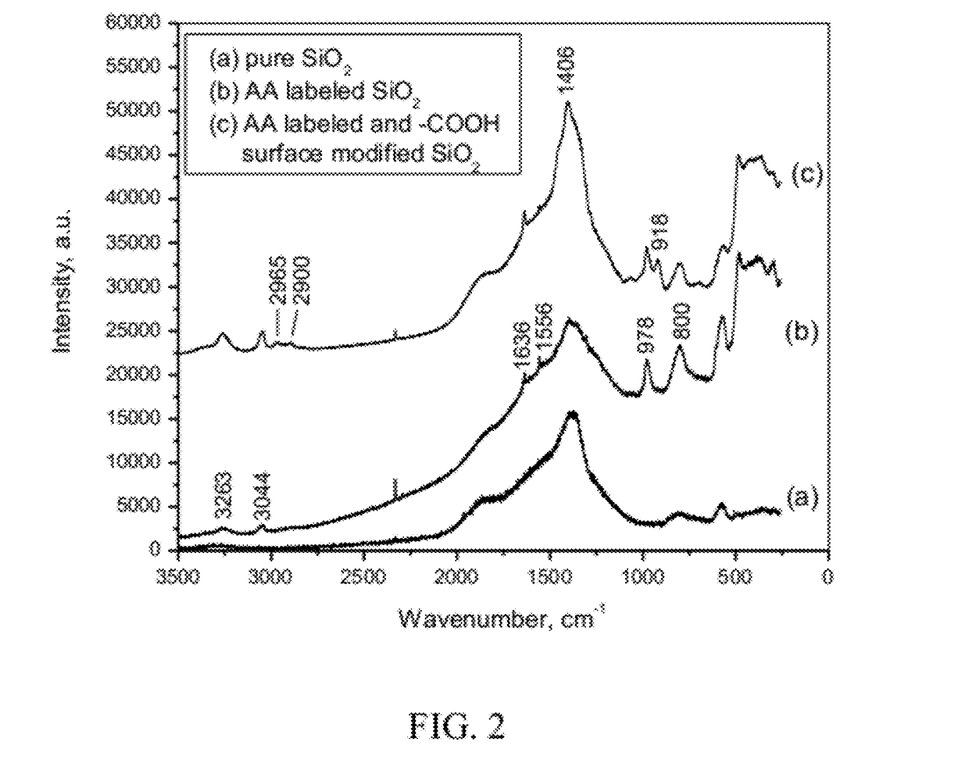
FIG. 2. Raman spectroscopic spectrum comparing unlabeled silicon oxide ($SiO_2$) nanoparticles (curve a), acrylic acid-doped $SiO_2$ nanoparticles (curve b), and acrylic acid-doped $SiO_2$ nanoparticles surface-functionalized with carboxy groups (curve c).

Raman spectra of dried particles were taken with a Renishaw spectrometer equipped with a Leico microscope and a 785-nm diode laser. The Raman spectrum of FIG. 2 shows bands at 1636, 1556, and 1406 $cm^{-1}$, attributable to the carboxy groups of the acrylic acid groups. After surface modification with additional carboxy groups, enhanced intensities for peaks at 1406, 1636, 2900, and 2965 $cm^{-1}$ and the appearance of a new peak at 918 $cm^{-1}$ are observed, thus indicating an increased level of carboxy functional groups in the nanoparticles.

EXAMPLE 2

Preparation and Analysis of Fluorophore-Volume Labeled Silica Nanoparticles 2.5 mg of a succinimidyl ester derivative of Alexa Fluor 430 was combined with 0.25 mL γ-aminopropyltrimethoxysilane (APS) in 10 mL of cyclohexane, and the solution stirred for 12 hours to produce the dye-siloxane intermediate. The reaction is depicted as follows (wherein $R^1$ represents an Alexa Fluor 430 moiety):

Although omitted in the above equation, it is understood that N-hydroxysuccinimide is a byproduct.

A microemulsion medium composed of 27.5 g Igepal CO-720, 22.0 mL hexanol, 170 mL cyclohexane, 10.7 mL water, and 2.5 mL 29% ammonia was prepared. A mixture of 10 mL of the dye-siloxane intermediate in cyclohexane solution and 9.3 mL TEOS was added into the microemulsion and stirred for 24 hours. The hydrolysis reaction is catalyzed by ammonia in the microemulsion medium. The reaction is depicted as follows (wherein $R^1$ represents an Alexa Fluor 430 moiety):

Co-polymerization of TEOS and dye-siloxane intermediate causes the dye molecules to be homogenously incorporated into $SiO_2$ nanoparticles. To stop the reaction, the microemulsion was destabilized, and the produced nanoparticles were collected by centrifugation. The nanoparticles were purified by washing with ethanol, acetone, and water multiple times.

Figure 3A:
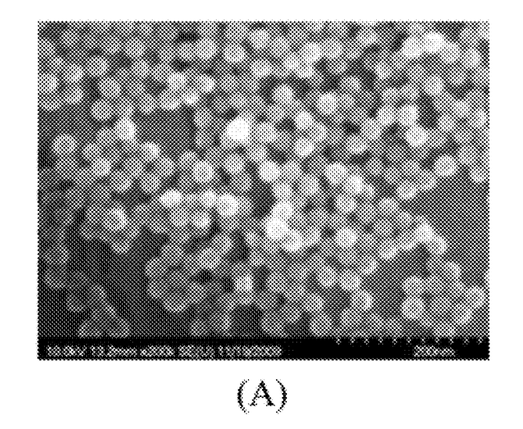
FIGS. 3A, 3B. SEM micrographs of (Alexa Fluor 430)-labeled silica nanoparticles at (A) 200K magnification for 32 nm particles, and (B) 110K magnification for 78 nm particles.
Figure 3B:
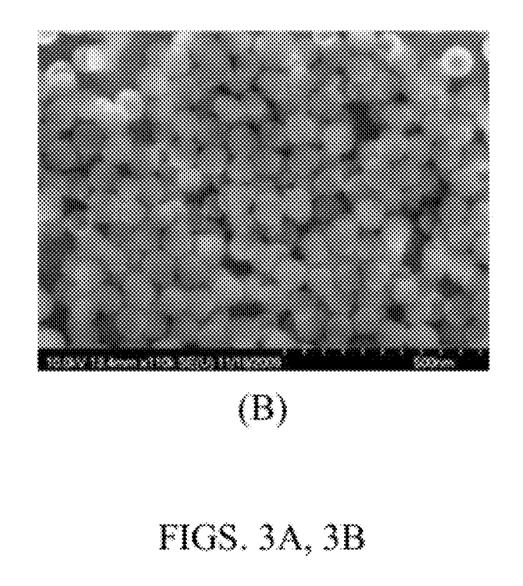

FIGS. 3A and 3B show SEM images of as-synthesized dye-labeled $SiO_2$ nanoparticles from different microemulsions. The SEM images were observed in a Hitachi S-4700 electron microscope. The images show that the synthesized nanoparticles are spherical shaped and highly uniform in size. FIG. 3A shows particles having a uniform size of 33.4±3.2 nm, and FIG. 3B shows particles having a uniform size of 77.9±4.3 nm. The microemulsion medium, along with chemical reagent concentration, pH, temperature, and reaction time can all be adjusted to control particle size. For example, although the syntheses were generally conducted at room temperature (generally, 23±1° C.) with magnetic stirring, higher reaction temperatures typically result in smaller particle sizes. As an additional example, the water droplet size in the microemulsion can be adjusted by changing the molar ratio of surfactant to water, thereby causing a corresponding change in the size of the resulting nanoparticles.

Figure 4:
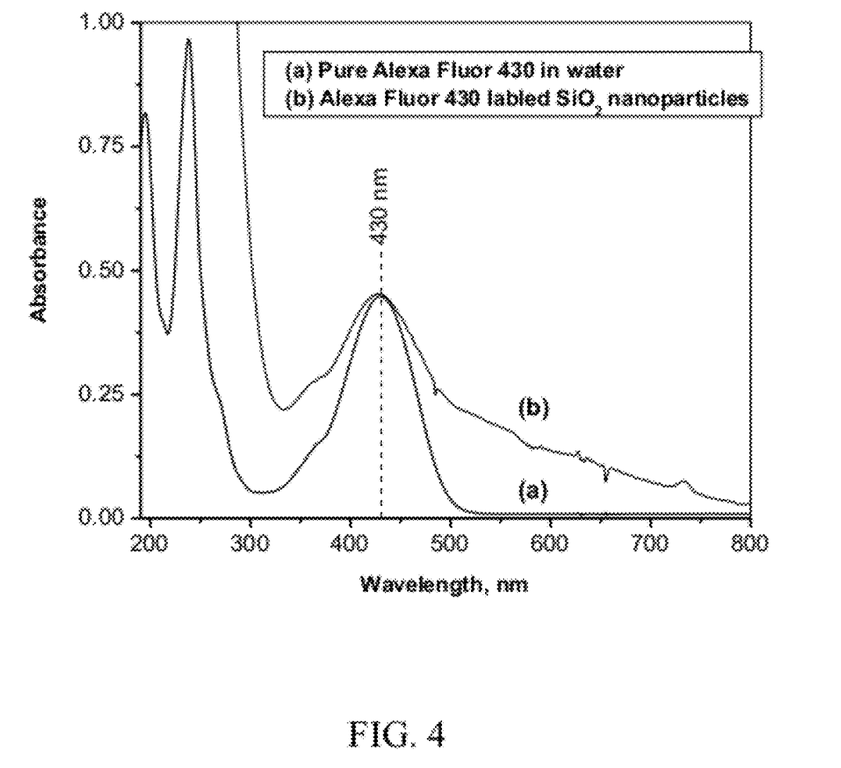
FIG. 4. Absorbance spectra comparing pure Alexa Fluor 430 in water (curve a) and (Alexa Fluor 430)-labeled silica nanoparticles (32 nm) in DMSO (curve b).

FIG. 4 compares the UV-visible absorbance spectra of pure Alexa Fluor 430 dye in water and dye-labeled $SiO_2$ nanoparticles in DMSO. The spectra were taken with a HP 8453 spectrometer in a 1-cm path quartz cell. The spectra confirm the existence of dye in $SiO_2$ nanoparticles and show that the dye is optically stable inside the $SiO_2$ nanoparticles.

Figure 5:
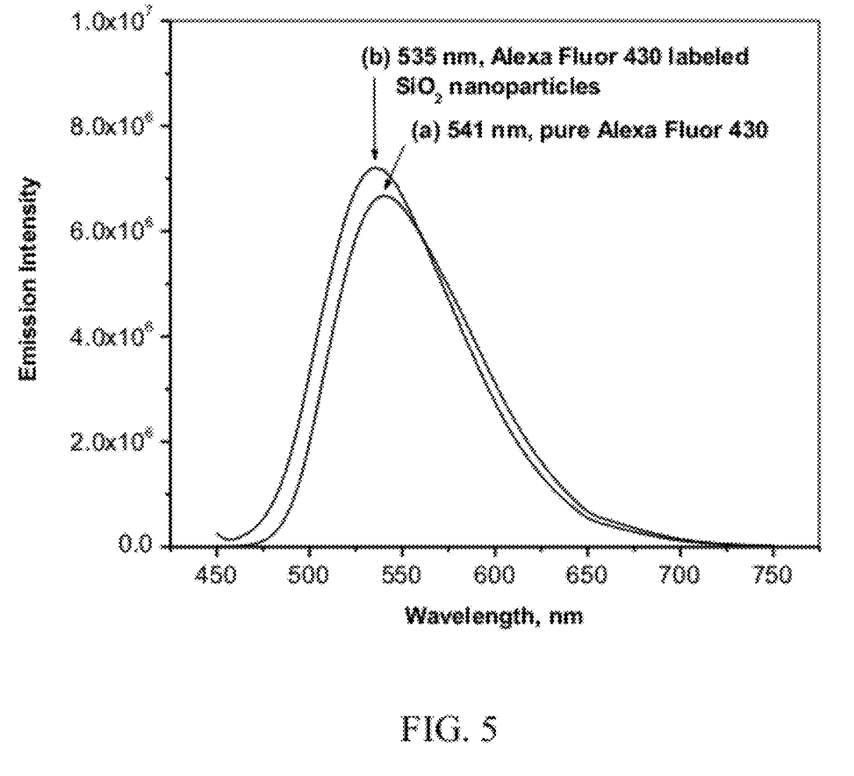
FIG. 5. Fluorescence emission spectra comparing pure Alexa Fluor 430 (curve a) and (Alexa Fluor 430)-labeled silica nanoparticles, 32 nm (curve b), both in water, at an excitation wavelength of 430 nm.

FIG. 5 shows fluorescence spectra for pure Alexa Fluor 430 dye and dye-labeled $SiO_2$ nanoparticles, both in water, at an excitation wavelength of 430 nm. Fluorescence spectra were measured using a JY-Spex Steady-State Fluorescence spectrometer. The fluorescence spectra further confirm the existence of dye in $SiO_2$ nanoparticles and show that the dye possesses a stable fluorescence, which is easily detectable at the ng/mL level of $SiO_2$ nanoparticles. The ~6 nm blue shift of wavelength in fluorescence emission is due to chemical interaction between dye and silane. This interaction was not found to affect fluorescence stability of the dye in the nanoparticles.

Figure 6:
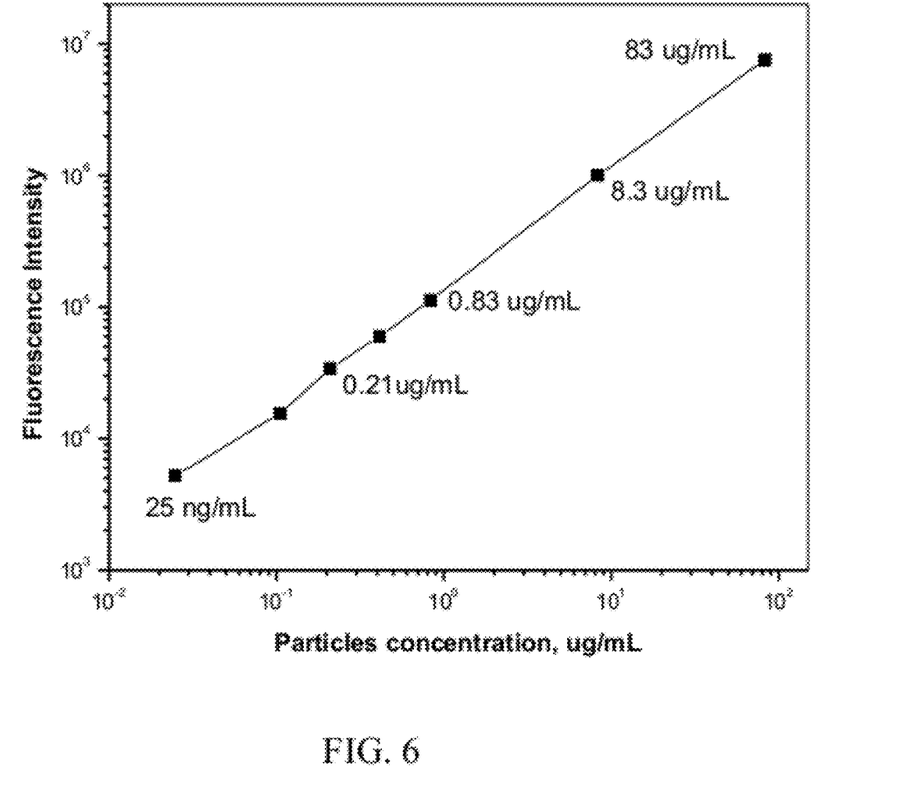
FIG. 6. A plot showing fluorescence intensities of (Alexa Fluor 430)-labeled silica nanoparticles at different concentrations in water (excitation at 430 nm, detection at 535 nm).

FIG. 6 shows fluorescence intensities of dye-labeled $SiO_2$ nanoparticles as a function of particle concentration at an excitation wavelength of 430 nm and detection wavelength of 535 nm. The plot demonstrates that the dye possesses a stable fluorescence across a wide range of concentrations. The spectra also reveal that the fluorescent nanoparticles are very bright and easily detectable at the ng/mL level While there have been shown and described what are at present considered the preferred embodiments of the invention, those skilled in the art may make various changes and modifications which remain within the scope of the invention defined by the appended claims.

What is claimed is:

1. A method for synthesizing volume-labeled nanosized objects, the method comprising reacting nanoparticle precursor molecules in the presence of at least one observable marker to produce said volume-labeled nanosized objects.

2. The method of claim 1, wherein at least a portion of said nanoparticle precursor molecules contain said observable marker.

3. The method of claim 1, wherein said observable marker comprises a radioisotope.

4. The method of claim 3, wherein said radioisotope has a half life of at least 25 days.

5. The method of claim 4, wherein said radioisotope is selected from the group consisting of carbon-14, technetium- 97, technetium-99, potassium-40, iodine-125, iodine-129, cesium-135, cesium-137, palladium-107, cadmium-113, strontium-90, europium-55, and tin-126.

6. The method of claim 1, wherein said observable marker comprises a fluorophore.

7. The method of claim 1, wherein said nanoparticle precursor molecules are comprised of silicon-containing molecules containing an observable marker therein, and the resulting volume-labeled nanosized objects are comprised of a silicon oxide composition, wherein said silicon-containing molecules are subjected to hydrolysis conditions to produce said volume-labeled nanosized objects, and said silicon-containing molecules are selected from silicon alkoxide, silicon hydroxide, silylamide, and silicon halide molecules.

8. The method of claim 7, wherein said observable marker comprises a radioisotope.

9. The method of claim 8, wherein said radioisotope has a half life of at least 25 days.

10. The method of claim 9, wherein said radioisotope comprises carbon-14.

11. The method of claim 7, further comprising synthesizing said silicon-containing molecules containing an observable marker therein, wherein said silicon-containing molecules containing an observable marker therein are synthesized by reacting, via an addition reaction, a vinyl-containing silane molecule with an acrylic acid derivative containing an observable marker therein.

12. The method of claim 11, wherein said silicon-containing molecule containing an observable marker therein is a polysiloxane molecule containing a multiplicity of observable markers therein.

13. The method of claim 11, wherein said observable marker is a radioisotope.

14. The method of claim 13, wherein said radioisotope comprises carbon-14.

15. The method of claim 7, further comprising synthesizing said silicon-containing molecules containing an observable marker therein, wherein said silicon-containing molecules containing an observable marker therein are synthesized by reacting an observable marker containing a first reactive group with a silane molecule containing a second reactive group reactive with the first reactive group.

16. The method of claim 15, wherein said observable marker is a fluorophore.

17. The method of claim 7, wherein said silicon-containing molecules containing an observable marker therein are deposited and hydrolyzed on the surfaces of core nanoparticles, such that a volume-labeled silica core is deposited on said core nanoparticles.

18. The method of claim 17, wherein said core nanoparticles have a magnetic metal oxide composition.

19. The method of claim 17, wherein said core nanoparticles have a quantum dot composition.

20. The method of claim 17, wherein said core nanoparticles have a noble metal composition.

* * * * *